Patented June 3, 1952

2,598,904

UNITED STATES PATENT OFFICE 2,598,904

SHAPED ZIRCON CERAMIC BODIES AND COMPOSITION AND METHOD OF PRODUCING THE SAME

Kenneth A. Gebler, Verona, N. J., assignor to The American Metal Company, Limited, New York, N. Y., a corporation of New York No Drawing. Application September 7, 1951, Serial No. 245,647

10 Claims. (Cl. 106—57)

This invention relates to composition for and method of producing shaped zircon ceramic bodies. While the invention has proven particularly useful in the manufacture of extruded shapes, such as filaments, rods, and tubes, it is within the contemplation of the invention that it may be usefully employed also in the manufacture of shaped zircon ceramic bodies by die casting, stamping or pressing, as will be understood by those skilled in the art after understanding the invention.

Zircon ceramic bodies and the method of making them by slip casting are well known. For example, Henry M. Schleicher et al., Patent No. 2,303,304, issued November 24, 1942, for "Method of Making Zircon Refractories," sets forth the characteristics of such a body which comprises from 94 to 96% of zircon and 6 to 4 parts of china clay. Zircon bodies of this character are desired for special purposes, such for example as fine rods and filaments for electronic uses. For example, in some cases it is desired to use such members as heating elements which are subjected to temperatures of the order of 700° C. or higher, and it has also been proposed to use ceramic cases for electronic tubes to withstand the high temperatures now encountered. The difficulty arises from the fact that certain desired zircon shapes, more especially fine rods and filaments could not be made by the methods heretofore known.

The customary method of producing rods and other elongated shapes of certain plastic ceramic material, such as clay, is by extrusion. However, zircon is non-plastic and in such proportions as required it cannot be forced through a die. In addition to the difficulty of extruding such nonplastic material through a die, no way heretofore has been known to produce, by extrusion or otherwise, relatively small elongated bodies, such as fine rods, filaments, and tubes of zircon ceramic having the desired properties above indicated.

An object of this invention is to provide a composition which readily may be formed into desired shape, such as by extrusion and which may be fired to provide the desired zircon ceramic body.

Another object is to provide a composition which provides not only facile forming to the desired shape but which when formed may be practically handled without damage between the forming and firing stages.

Another object is to provide a method of preparing said composition.

A further object is to provide a method of forming shaped zircon ceramic bodies.

In general, my invention comprises conditioning the zircon and clay with certain organic agents and water in certain proportions to provide a mix which may be readily formed into the desired shape, will retain its shape during handling required in firing and will not detract from the desired characteristics of the finished product. The ingredients are intermixed in a manner to assure homogeneity and the mix is formed to desired shape, such as by charging an extrusion press and forcing the mix through a suitable die. As an example of the character of the products obtainable: I have successfully made by extrusion zircon ceramic rods of a diameter as small as 0.009" and as large as 1" and have also made tubes of various sizes.

A composition which I have found entirely satisfactory for the production, by extrusion, of filaments and rods of the character above referred to was made from the following ingredients in the relative proportions set forth:

Milled zircon 96 parts by weight
China clay 4 parts by weight
Corn flour 1 to 2 parts by weight
Sodium alginate (2% solution) 6.25 parts by weight
Paraffine wax emulsion (containing about 45% solids) 10 parts by weight
Water 2 parts by weight The milled zircon preferred and which has given satisfactory results for extrusion of small sizes is high grade 99% through 325 mesh to the inch, known as "G" grade produced by Titanium Alloy Mfg. Co.; the china clay used by me is the Lee Moor brand, English china clay, purchased from Hammill & Gillespie, this clay being in finely pulverized condition; the corn flour was likewise relatively fine and was produced by Illinois Cereal Mills. My preference for the hydrophilic agent is the product sold by Kelco Company under the name "Superloid" and for convenience in measuring and mixing it was used as a 2% solution, of which 6.25 parts is the equivalent of 0.125 part of the agent; and the paraffine wax emulsion used by me was sold by Socony-Vacuum Oil Co., Inc. under the name "Ceremul C." While I have set forth for convenience the source of the products which I have found entirely satisfactory it is to be understood, of course, that the products of other concerns than those given may be substituted if they have similar properties. While zircon of the fineness of the order of 325 mesh is preferred, especially for small sizes or shapes, the invention may be usefully employed with the use of zircon particles somewhat coarser, say no larger than 200 mesh.

In addition to the zircon and clay, which constitute the contents of the ceramic body above referred to; the purpose of the other ingredients will now be referred to. The insoluble ceramic flour, such as corn flour, adds both wet and dry strength to the mixture. It permits handling of the freshly extruded material in transferring from an extruding or forming die to a drying and firing furnace. This is especially important in extruded shapes where the extruded material is normally emitted in a vertical direction and must be transferred to a horizontal position for firing. Without the addition of the flour the extruded material is quite fragile. I have found that the content of flour may be varied from ½ to 2 parts. The sodium alginate is extremely hydrophilic and because of this water retaining property it has been selected to minimize "bleeding" of the water content in the extrusion or forming process. The sodium alginate is added to the mixture in solution form to facilitate mixing and I have found a 2% solution to be useful for this purpose; however, the sodium alginate may of course be added in stronger or weaker dilution, the important point being the maintenance of the desired proportions of the hydrophilic agent. Similarly, the paraffine wax solids or emulsion particles, are conveniently added in the form of a paraffine wax emulsion. Since the primary function of this material is to provide lubrication between the non-plastic zircon particles and to minimize die wear, it is not important to add these wax particles in the same emulsion concentration as I have above indicated so long as the proper proportion of such wax particles are used. Water causes the mixture to cohere and to have the proper consistency for extrusion. I have found that the total liquid content is critical within narrow limits and therefore the added water should be varied in accordance with any variation of the water content in the hydrophilic agent solution and the paraffine wax emulsion. If too little liquid is present in the mixture the batch will not extrude through fine dies or if liquids in excess of about 15% of the zircon-clay mix by weight are present the batch will become thixotropic and will flow out too soupy. In order to indicate this the proportions of dry materials and total water content for the example previously given will now be set forth. For every 100 parts by weight of zircon-clay mixture the following ingredients in the relative proportions set forth are added:

Ceramic flour 1 to 2 parts by weight
Sodium alginate 0.125 part by weight of solids
Paraffine wax particles 4.5 parts by weight of solids
Water, total content 13.57 parts by weight As above indicated, the zircon-clay content may be varied, i. e., not less than 94 or more than 96 parts of zircon and not less than 4 or more than 6 parts of clay. Some variation in the proportions of the organic materials and water is permissible, depending upon the circumstances, size of bodies to be formed, etc. I have found that for extrusion purposes the proportions of the organic ingredients and the total water content should be held to substantially the following limits:

*Solid Organics*

Paraffine 4-5% by weight of the zircon-clay mix

Corn flour 0.5-2% by weight of the zircon-clay mix
Sodium alginate 0.1-0.2% by weight of the zircon clay mix

*Liquid Content*

Sufficient water to bring the total liquid content to 12-15% by weight of the zircon-clay mix The ingredients are thoroughly mixed and the batch is charged into the extrusion press either warm or at room temperature. I have found that a pressure of 2 to 3 tons on a 2½" ram suffices to force the mix through the die at a satisfactory rate. No particular care must be taken in drying and firing the finer sizes, say ⅛" or smaller. However, the thicker sizes must be dried and fired slowly, especially up to 1000° F., at which temperature it may be assumed that all the tightly held water is expelled and the organic matter decomposed. The temperature of firing depends upon the use to which the bodies are to be put. If fired at 2300° F. the elongated bodies can be cut to length and otherwise trimmed or shaped. Firing at 2800° F. renders the shapes hard and strong but still porous enough for certain special uses, as for instance impregnation with carbon by gaseous decomposition. After firing at 2300° F. and in final trimmed condition the bodies may be hardened by soaking in phosphoric acid and again firing at 2300° F. as more particularly set forth in said Patent No. 2,303,304. Bodies hardened in this fashion are also porous.

I have found that shrinkage from the die size to the elongated bodies after firing at 2800° F. is about 7.15% and as to bodies fired at 2300° F. the decrease in diameter is of the order of 0.15%. There is no appreciable dimensional change in refiring at 2300° F. after soaking in phosphoric acid. For example, with the die diameter of 0.030" the resulting zircon rod diameter fired at 2800° F. is 0.028".

Having thus described my invention with particularity with reference to the preferred composition and the preferred method of producing and utilizing the same, and having referred to some of the possible modifications of the invention, it will be obvious to those skilled in the art, after understanding the invention, that other changes and modifications may be made therein without departing from the spirit and scope of the invention, and it is aimed in the appended claims to cover such changes as come within the scope of the invention.

What I claim is:

1. A composition for use in forming shaped zircon ceramic bodies, comprising an intimate mixture of from 94 to 96 parts of milled zircon and 6 to 4 parts of china clay by weight and 16 to 22 parts by weight of organic solids and water, said organic solids and water comprising 0.1 to 0.2 part of sodium alginate, 0.5 to 2 parts of ceramic flour, 4 to 5 parts of paraffine particles and not less than 12 nor more than 15 parts of water.

2. A composition for use in forming shaped zircon ceramic bodies, comprising an intimate mixture of from 94 to 96 parts of milled zircon, 6 to 4 parts of china clay by weight, 0.5 to 2 parts of corn flour, 0.1 to 0.2 part of sodium alginate, 4 to 5 parts of paraffine particles and not less than 12 nor more than 15 parts of water, said sodium alginate being the residual solid content of a solution and said paraffine being the residual solid content of an emulsion.

3. A composition for use in forming shaped zircon ceramic bodies, comprising the following ingredients intimately intermixed in substantially the following relative proportions by weight:

Zircon 94 to 96 parts
China clay 6 to 4 parts
Ceramic flour ½ to 2 parts
Sodium alginate 0.1 to 0.2 part (solids)
Paraffine 4 to 5 parts (solids)
Water 12 to 15 parts 4. A composition for use in forming shaped zircon ceramic bodies, comprising the following ingredients intimately intermixed in substantially the following relative proportions by weight:

| | Parts |
|---|---|
| Zircon (99% through 325 mesh) | 96 |
| China clay (finely pulverized) | 4 |
| Corn flour | 1 to 2 |
| Sodium alginate | 0.125 |
| Paraffine (emulsion particles) | 4.5 |
| Water | 13.5 |

5. The method of preparing a composition for use in forming shaped zircon ceramic bodies, comprising thoroughly mixing in relative proportions by weight 100 parts of a zircon clay mixture consisting of 94 to 96 parts of zircon and 6 to 4 parts of china clay with 0.5 to 2 parts of ceramic flour, a solution of sodium alginate sufficient to provide 0.1 to 0.2 part of solids, paraffine wax emulsion sufficient to provide 4 to 5 parts of paraffine particles and sufficient water to bring the total liquid content of the mixture to at least 12 and not more than 15 parts.

6. The method of preparing a composition for use in forming shaped zircon ceramic bodies, comprising thoroughly mixing in relative proportions by weight 100 parts of a zircon clay mixture consisting of substantially 96 parts of zircon and 4 parts of china clay with 1 to 2 parts of ceramic flour, substantially 6.25 parts of a 2% solution of sodium alginate, substantially 10 parts of paraffine wax emulsion containing paraffine particles of the order of 45%, and substantially 2 parts of water.

7. The method of forming a shaped zircon ceramic body, which comprises taking a mixture consisting of from 94 to 96 parts zircon, 6 to 4 parts of china clay, 0.5 to 2 parts of ceramic flour, 0.1 to 0.2 part of sodium alginate, 4 to 5 parts of paraffine in finely divided particles, and 12 to 15 parts of water, forming said mixture into desired body shape under pressure, drying and firing the shaped body to a temperature of the order of 2300° to 2800° F.

8. The method of making elongated zircon ceramic bodies, which comprises taking a batch consisting of an intimate mixture of 94 to 96 parts of zircon of a fineness of the order of at least 200 mesh, 6 to 4 parts of finely pulverized china clay, 0.5 to 2 parts of corn flour, 0.1 to 0.2 part of sodium alginate, 4 to 5 parts of paraffine wax and 12 to 15 parts of water, extruding said batch into elongated shapes and thereafter heating said shaped bodies to a temperature of the order of 2300° to 2800° F.

9. In a method of producing a shaped zircon ceramic body, the steps which consist in taking a mixture consisting of from 94 to 96 parts zircon, 6 to 4 parts of china clay, 0.5 to 2 parts of ceramic flour, 0.1 to 0.2 part of sodium alginate, 4 to 5 parts of paraffine in finely divided particles, and 12 to 15 parts of water, forming said mixture into desired body shape under pressure, heating said shaped body to a temperature sufficient to reduce said body to a content consisting substantially entirely of zircon and clay.

10. In a method of producing an elongated zircon ceramic body, the steps which consists in taking a batch consisting of an intimate mixture of 94 to 96 parts of zircon of a fineness of the order of at least 200 mesh, 6 to 4 parts of finely pulverized china clay, 0.5 to 2 parts of corn flour, 0.1 to 0.2 part of sodium alginate, 4 to 5 parts of paraffine wax and 12 to 15 parts of water, extruding said batch into an elongated shape and thereafter heating said shaped body to a temperature sufficient to reduce said body to a content consisting substantially entirely of zircon and clay.

KENNETH A. GEBLER.

No references cited.